US008025299B2

(12) United States Patent
Hiltz

(10) Patent No.: US 8,025,299 B2
(45) Date of Patent: Sep. 27, 2011

(54) COLLAPSIBLE MECHANIC'S CREEPER

(75) Inventor: Nathan Hiltz, Newmarket (CA)

(73) Assignee: Nathan Hiltz, New Market, Ontario (CA)

( * ) Notice: Subject to any disclaimer, the term of this patent is extended or adjusted under 35 U.S.C. 154(b) by 195 days.

(21) Appl. No.: 12/473,691

(22) Filed: May 28, 2009

(65) Prior Publication Data

US 2010/0038870 A1    Feb. 18, 2010

Related U.S. Application Data

(60) Provisional application No. 61/056,637, filed on May 28, 2008.

(51) Int. Cl.
*B25H 5/00* (2006.01)
(52) U.S. Cl. ........................ 280/32.6; 280/638
(58) Field of Classification Search ................ 280/30, 280/32.6, 638, 35, 32.5
See application file for complete search history.

(56) References Cited

U.S. PATENT DOCUMENTS

| | | | |
|---|---|---|---|
| 1,285,923 A | | 11/1918 | Buetefisch et al. |
| 1,368,716 A | | 2/1921 | Gontrum et al. |
| 2,738,200 A | * | 3/1956 | De Haven ................ 280/32.5 |
| 3,846,855 A | * | 11/1974 | Peterson .................... 5/114 |
| 3,933,164 A | * | 1/1976 | Ness et al. ................ 135/95 |
| 4,619,464 A | | 10/1986 | Hwang |
| 4,698,731 A | * | 10/1987 | Johns, Sr. ................. 362/486 |
| D367,140 S | | 2/1996 | Reese |
| 5,863,053 A | | 1/1999 | Berry |
| 6,095,532 A | | 8/2000 | Martin |
| 6,164,671 A | * | 12/2000 | Darling, III ............... 280/30 |
| RE37,372 E | | 9/2001 | Smith |
| 6,540,378 B2 | * | 4/2003 | Alsup ....................... 362/253 |
| 6,805,269 B2 | * | 10/2004 | Lockard .................... 224/153 |
| 7,032,908 B2 | | 4/2006 | Melvin |
| 2003/0075384 A1 | | 4/2003 | Pickering |
| 2004/0070179 A1 | * | 4/2004 | Miller et al. ............... 280/651 |
| 2004/0227313 A1 | | 11/2004 | Shockley |
| 2005/0102882 A1 | * | 5/2005 | Williams ................... 43/21.2 |
| 2007/0013154 A1 | * | 1/2007 | Staples ..................... 280/32.6 |
| 2007/0080510 A1 | * | 4/2007 | Ji ............................. 280/32.6 |
| 2008/0136129 A1 | * | 6/2008 | Wu .......................... 280/32.6 |

\* cited by examiner

*Primary Examiner* — Ruth Ilan
(74) *Attorney, Agent, or Firm* — Hodgson Russ LLP

(57) ABSTRACT

According to one aspect of the present invention there is provided a creeper, comprising a generally rectangular frame. Two sides of the frame may each comprise a plurality of telescoping members. Wheels may depend from the frame. A flexible covering may be provided, affixed to and generally filling said frame. The telescoping members can be positioned in at least two configurations, including a first, operating configuration where the frame is fully extended and usable as a creeper, and a second, storage configuration where the frame is fully retracted, and wherein the flexible covering does not need to be removed from the frame when the creeper is changed from the operating configuration to the storage configuration.

17 Claims, 4 Drawing Sheets

COLLAPSIBLE MECHANIC'S CREEPER

CROSS-REFERENCE TO RELATED APPLICATION

This application claims the benefit of priority to U.S. provisional patent application Ser. No. 61/056,637, on May 28, 2008, now pending, the disclosure of which is incorporated herein by reference.

FIELD OF THE INVENTION

The present invention relates to carts, or creepers, typically used by mechanics, car/truck operators, and the like, to work around and (more commonly) beneath vehicles. Specifically, the invention is directed to a collapsible creeper that is full size when used, but can be collapsed into a much smaller space for storage, for example, behind a truck driver's seat.

BACKGROUND OF THE INVENTION

Creepers are used in a variety of applications. The most common is the use by a mechanic to provide support and/or mobility while working around or on the underside of a vehicle. Creepers are also used by truck drivers to check on the underside of their vehicles at rest stations or curbside.

Creepers generally are configured as a plank or frame, often upholstered and/or cushioned, with wheels attached to its lower side. The wheels are adapted to provide multidirectional mobility to the creeper while supporting the user, and enable the user to work in environments with low vertical clearances.

A creeper typically (and preferably) has a construction that can support the entire weight of the user.

Since a creeper is typically used by a user lying in a horizontal position, it is often a large item. Although often less than a foot off the ground when in use, creepers are typically 3-5 feet long and 1.5-3 feet wide, in order to accommodate a full-size user. Creepers therefore take up a fair amount of space, which is disadvantageous for portability, for example, for use by a truck driver while on the road.

It would therefore be desirable to have a creeper that is collapsible, that can be stored in the limited space available to a truck driver while on the road, for example, behind the driver's seat of a typical truck cab.

Collapsible or separable creepers are generally known in the art. U.S. Pat. Nos. 4,580,799 and 4,889,352 describe creepers formed by two hinged sections. The creepers can be folded in order to reduce their overall size when not in use. U.S. Pat. Nos. 5,022,670, 5,297,809 and 5,863,053, and US patent publication 2007/0080510 disclose creepers that are constructed of two separable panels. US patent publication 2004/0227313 discloses a multi-function mechanic's creeper having a plurality of functional positions. The creeper includes a frame assembly having rigid base, middle and head sections, such sections allowing the creeper to be configured into a variety of functional positions, including a foldable position. US RE37,372 discloses a creeper/work seat having two end platforms that can be slid apart to opposite ends of a central platform to form a full-length creeper, that can be reconfigured into a work seat with a shelf platform. U.S. Pat. No. 6,095,532 also discloses a folding creeper with a variety of configurations, including a storage section. U.S. Pat. No. 7,032,908 describes a mechanic's creeper having a retractable extension which enables the device to be collapsed from a fully extended working configuration to a more compact size. The creeper therein described comprises a plurality of rigid panels.

It would be desirable to have a creeper that is light-weight, collapsible, and possibly devoid of rigid plank sections, that is light weight and can be stored within limited confines.

SUMMARY OF THE INVENTION

According to one aspect of the present invention there is provided a creeper, comprising a frame, having a head cross member, a foot cross member, a left side member, and a right side member, said left side member and right side member each having a head end, connected to opposing ends of said head cross member, and a foot end connected to opposing ends of said foot cross member, to form a generally rectangular frame, said left side member and right side member each comprising a plurality of telescoping members, a left and a right head end wheel depending from said frame, near or depending from said head cross member, a left and a right foot end wheel depending from said frame, near or depending from said foot cross member, a flexible covering, affixed to and generally filling said frame, wherein the telescoping members can be positioned in at least two configurations, including a first, operating configuration where the frame is fully extended and usable as a creeper, and a second, storage configuration where the frame is fully retracted and the left side member and the right side member are significantly shorter in length than in the first configuration, and wherein the flexible covering does not need to be removed from the frame when the creeper is changed from the operating configuration to the storage configuration.

In one embodiment of the present invention, the flexible covering is affixed to the head cross member and the foot cross member.

In a further embodiment of the present invention, the flexible covering is affixed to the telescoping members.

In a further embodiment of the present invention, the flexible covering is canvas, fabric, plasticized canvas, plasticized fabric, or plastic.

In certain embodiments of the present invention, the flexible covering is water resistant.

In certain embodiments, the creeper has a cross member length of between 12 and 30 inches, a side member length, in the operating configuration, of between 30 and 50 inches, and a side member length, in the storage configuration, of between 5 and 18 inches. In one embodiment, the creeper has a cross member length of about 17 inches, a side member length, in the operating configuration, of about 40 inches, and a side member length, in the storage configuration, of about 6 inches.

In one embodiment, the flexible covering is capable of supporting the weight of a user, when the creeper is in the operating configuration.

In one embodiment at least one of the wheels is a caster, for example, a swiveling caster.

In one embodiment, the creeper further comprises a reflective, luminescent, or illuminated strip.

In a further embodiment, the flexible covering is removable and washable.

In a further embodiment, the telescoping members stay in the operating position by means of a friction fit.

In a further embodiment, the telescoping members stay in the operating position by means of a spring-loaded locking mechanism.

In a further embodiment, the telescoping members stay in the operating position by means of ball bearing bushings, which snap into apertures in the telescoping members when in the operating position. Such ball bearings may be operably connected to a push button which lifts all bushings out of the apertures to facilitate closing the telescoping members into the storage position.

Another aspect of the present invention is a kit comprising the creeper as hereinbefore described and a storage bag, said storage bag being of a size capable of storing the creeper when in its storage configuration.

In a further embodiment, the telescoping members comprise a set of magnets that affix to one another when the storage position, providing resistance such that additional force is required to move the telescoping members from the storage position to the operating position.

DETAILED DESCRIPTION OF THE INVENTION

Figure 1:
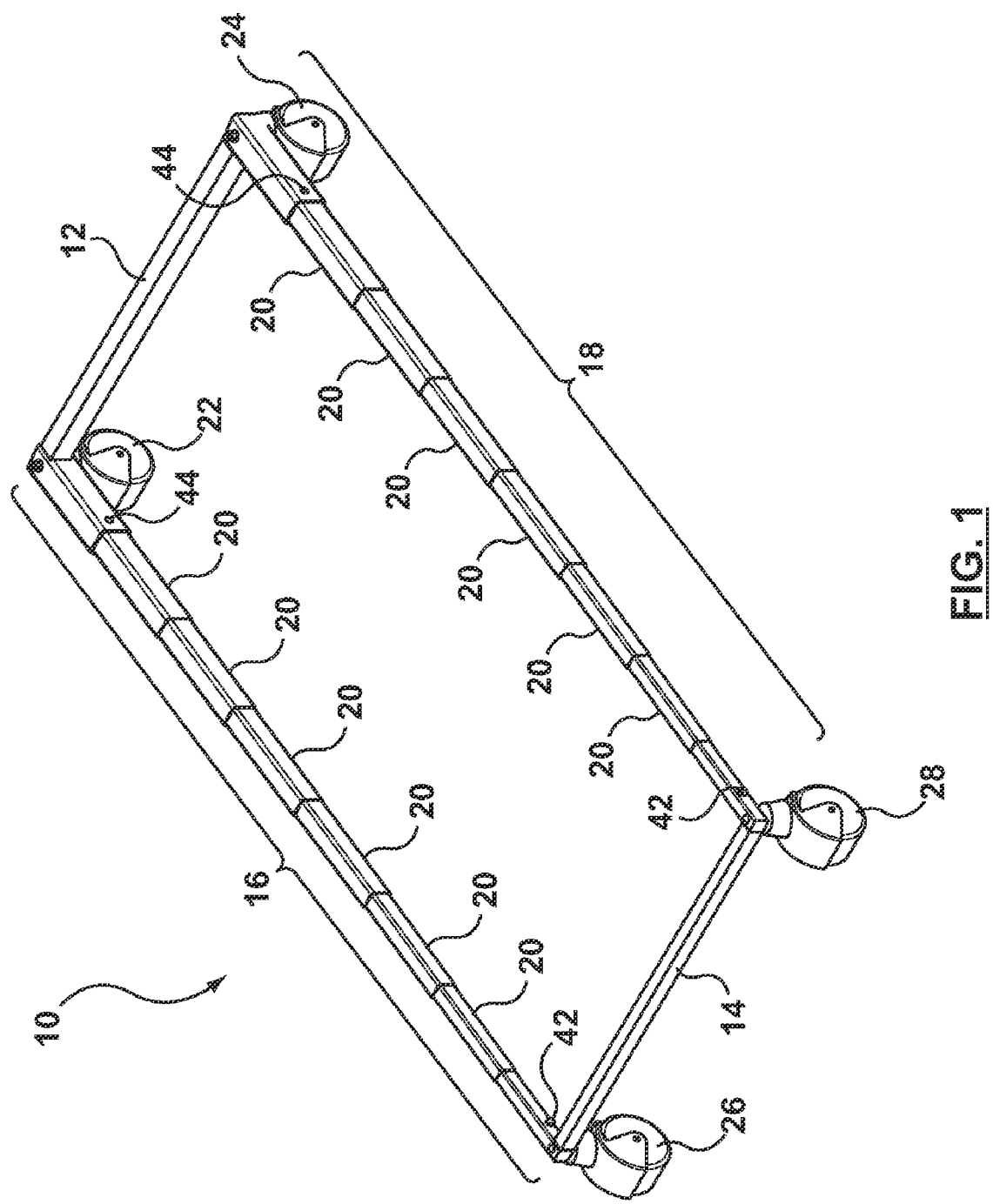
FIG. 1 is an illustration of a frame of a creeper that is an embodiment of the present invention, shown in its open, or operating position.

FIGS. 1-4 show one embodiment of the present invention. FIG. 1 shows the frame portion of a creeper of the present invention, in its open, or operating, configuration. The frame 10 comprises a head cross member 12, a foot cross member 14, a left side member 16 and a right side member 18. The head end of the left side member 16 is affixed to the left end of the head cross member 12. The foot end of the left side member 16 is affixed to the left end of the foot side member 14. The head end of the right side member 18 is affixed to the right end of the head cross member 12, and the foot end of the right side member 18 is affixed to the right end of the foot cross member 14. The four members form a frame 10, generally rectangular or square in shape.

Each of left side member 16 and right side member 18 comprise a plurality of telescoping members 20. As shown, the telescoping members are cuboid, however, a cylindrical shape may also be used (not shown). As shown, the telescoping members 20 fit into one another such that the telescoping member 20 of largest diameter is closest to the head cross member 12. However, as would be understood by a person skilled in the art, the telescoping member 20 of largest diameter could be closest to the foot cross member 14, or in the middle of the side member (16, 18). The telescoping members 20 are configured to slide into one another, in a telescoping manner. As shown, the telescoping members remain in the operating configuration through a friction fit; a user would apply force to either or both of the foot cross member 14 or the head cross member 12 to collapse the frame 10 into the storage configuration, shown in FIG. 2. However, as would be understood by a person skilled in the art, a variety of different methods can be used to keep the frame 10 in the operating position, including spring biased locking elements (not shown) or a pin (not shown) on each of the telescoping members 20, or, in the case of cylindrical shaped telescoping members (not shown), the telescoping members may screw into one another. In one method (not shown), ball bearing bushings are used, and slip into apertures in the telescoping members 20 to "lock" the frame 10 in the operating position; a push button (not shown) connected by a wire or spring to the bushings can be used to facilitate closure of the telescoping members into the closed position by releasing the bushings from the apertures.

A magnet 44 on the largest telescoping member 20 is placed to connect with a second magnet 42 on the smallest telescoping member 20, in a position such that, when in a closed position, the magnet 42 and the magnet 44 touch, and attract one another to help the frame 10 remain in the closed position. In this manner, additional force is required to open the frame into the open position.

Also shown are wheels, in particular, a left head wheel 22, a right head wheel 24, a left foot wheel 26, and a right foot wheel 28. The wheels, as shown, are mounted on a rotating plate, making them swiveling casters.

Figure 2:
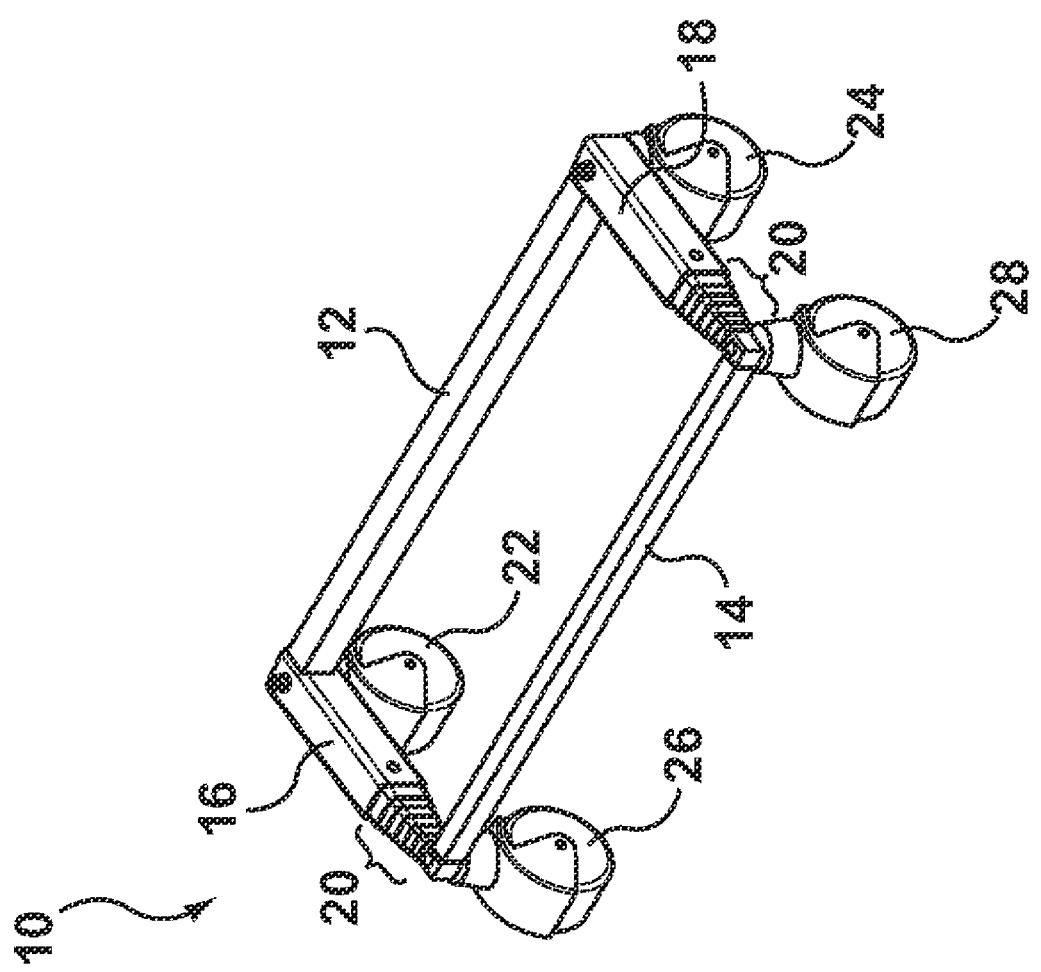
FIG. 2 is an illustration of a frame of a creeper that is an embodiment of the present invention, shown in its closed, or storage position.

FIG. 2 shows the frame portion of FIG. 1, in a closed or storage configuration. The telescoping members 20 are shown collapsed into one another, significantly altering the length of the frame 10.

Figure 3:
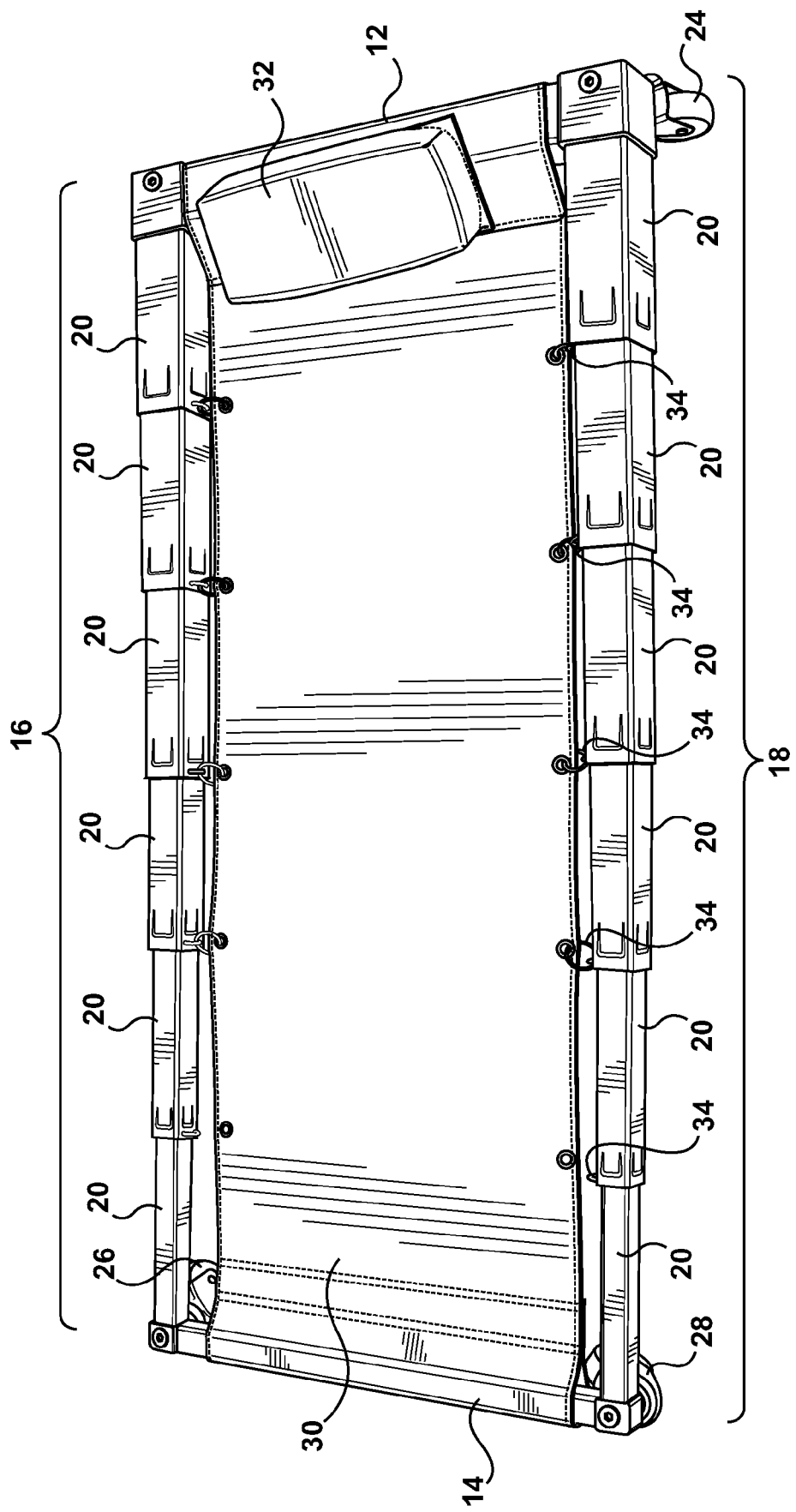
FIG. 3 is a photograph an illustration of a creeper that is an embodiment of the present invention, shown in its open, or operating position.
Figure 4:
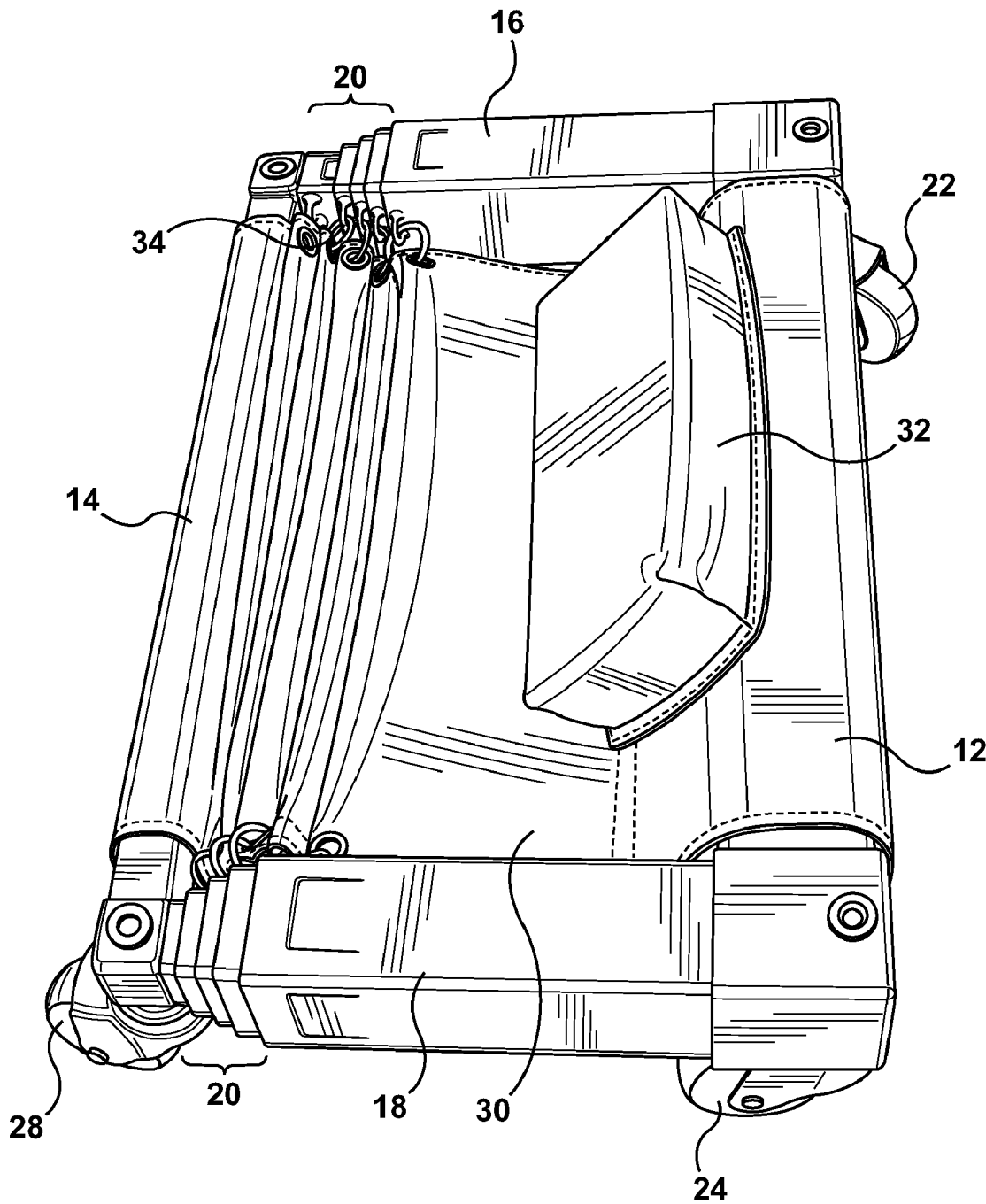
FIG. 4 is a photograph an illustration of a creeper that is an embodiment of the present invention, shown in its closed, or storage position.

FIG. 3 is an illustration of the creeper of FIG. 1, again, in the open, or operating position. Here, however, the full creeper is shown, rather than just the frame 10. A flexible covering 30 is fastened to the head cross member 12 and the foot cross member 14, as shown, by means of a loop in the flexible covering 30. However, other fastening means can be utilized. As shown, the flexible covering 30 has grommets 34, to aid in fastening the flexible covering 30 to each of the telescoping members 20, to provide additional support for the flexible covering 30. The flexible covering 30 must be fastened to the frame 10 in a manner that permits the flexible covering 30 to support the weight of a user, but that also permits the flexible covering 30 to fold when the frame 10 is changed from its operating configuration (FIGS. 1, 3) to its storage configuration (FIGS. 2, 4). In particular, the fastening of the flexible covering 30 to the telescoping members 20 should be in a manner that the flexible covering 30 does not impede the sliding of the telescoping members 20 into one another. One way of doing this, as shown, is to have the flexible covering 30 fastened to the end of each of the telescoping members 20, directly before the next, smaller, telescoping member 20. Another way of doing this (not shown) is to have the flexible covering 30 loop around the left side member 16 and right side member 18, in a manner similar to that shown for the attachment to the head cross member 12 and the foot cross member 14.

As shown in FIG. 3, the creeper also has a pillow 32, on one end of the flexible covering 30.

FIG. 4 shows an illustration of the creeper of FIG. 3, this time, in the closed, or storage position. Note that the telescoping members 20 are shown collapsed into one another, and the frame is now of a size that it can easily fit behind the seat of most truck cabs.

As shown, the creeper is about 17 inches in width (i.e. the length of the head and foot cross members (12, 14) is about 17 inches. Fully extended (i.e., in the operating, or open position, FIGS. 1, 3), the creeper is about 40 inches in length. In the storage, or closed position (FIGS. 2, 4), the creeper is about 6-7 inches in length.

The entire frame 10, the flexible cover 30, or any one component of the creeper can comprise a luminescent or reflective material, or can be affixed with a luminescent or reflective material (not shown). This permits the creeper to be more easily seen at night, and is especially helpful for road side applications. The creeper may also comprise illumination, for example, a strip of LED lights along the head cross member, for this same purpose (not shown).

Also, the flexible cover can be of any known material capable of providing support for the weight of a user, while being flexible enough to fold when the creeper is in its storage position; for example, fabric, canvas, or a plastic. The canvas or fabric may be plasticized, and the flexible cover may be removable and washable, which is advantageous, especially in "roadside" use situations, where often the creeper can get quite dirty.

The creeper may be sold in combination with a storage bag of an appropriate size to fit the creeper in its closed, storage position.

While a preferred embodiment of the invention has been described using specific terms, such description is for illustrative purposes only, and is to be understood that changes and variations may be made without departing from the spirit or scope of the following claims. All cited documents are herein incorporated by reference thereto.

The invention claimed is:

1. A creeper, comprising:
   (a) a frame, having:
      a head cross member;
      a foot cross member;
      a left side member;
      a right side member;
   said left side member and right side member each having a head end, connected to opposing ends of said head cross member, and a foot end connected to opposing ends of said foot cross member, to form a generally rectangular frame;
   said left side member and right side member each comprising a plurality of telescoping members;
   (b) a left and a right head end wheel depending from said frame, near or depending from said head cross member;
   (c) a left and a right foot end wheel depending from said frame, near or depending from said foot cross member;
   (d) a flexible covering, affixed to and generally filling said frame;
   wherein the telescoping members can be positioned in at least two configurations, including a first, operating configuration where the frame is fully extended and usable as a creeper, and a second, storage configuration where the frame is fully retracted and the left side member and the right side member are less than half the length than in the first configuration;
   and wherein the flexible covering does not need to be removed from the frame when the creeper is changed from the operating configuration to the storage configuration.

2. The creeper of claim 1 wherein the flexible covering is affixed to the head cross member and the foot cross member.

3. The creeper of claim 1 wherein the flexible covering is affixed to the telescoping members.

4. The creeper of claim 1 wherein the flexible covering is of a material selected from the group consisting of canvas, fabric, plasticized canvas, plasticized fabric, and plastic.

5. The creeper of claim 1 wherein the flexible covering is water resistant.

6. The creeper of claim 1 having a cross member length of between 12 and 30 inches, a side member length, in the operating configuration, of between 30 and 50 inches, and a side member length, in the storage configuration, of between 5 and 18 inches.

7. The creeper of claim 6 wherein the cross member length is about 17 inches, the side member length, in the operating configuration, is about 40 inches, and the side member length, in the storage configuration, is about 6 inches.

8. The creeper of claim 1 wherein, when in the operating configuration, the flexible covering is capable of supporting the weight of a user.

9. The creeper of claim 1 wherein at least one of the wheels is a caster.

10. The creeper of claim 9 wherein the caster is a swiveling caster.

11. The creeper of claim 1 further comprising a reflective, luminescent, or illuminated strip on at least one of the members.

12. The creeper of claim 1 wherein the flexible covering is removable and washable.

13. The creeper of claim 1 wherein the telescoping members stay in the operating position by means of a friction fit.

14. The creeper of claim 1 wherein the telescoping members stay in the operating position by means of a spring-loaded locking mechanism.

15. The creeper of claim 1 wherein the telescoping members stay in the operating position by means of a ball bearing bushing/aperture system.

16. A creeper, comprising:
   (a) a frame, having:
      a head cross member;
      a foot cross member;
      a left side member;
      a right side member;
   said left side member and right side member each having a head end, connected to opposing ends of said head cross member, and a foot end connected to opposing ends of said foot cross member, to form a generally rectangular frame;
   said left side member and right side member each comprising a plurality of telescoping members;
   (b) a left and a right head end wheel depending from said frame, near or depending from said head cross member;
   (c) a left and a right foot end wheel depending from said frame, near or depending from said foot cross member;
   (d) a flexible covering, affixed to and generally filling said frame;
   wherein the telescoping members can be positioned in at least two configurations, including a first, operating configuration where the frame is fully extended and usable as a creeper, and a second, storage configuration where the frame is fully retracted and the left side member and the right side member are significantly shorter in length than in the first configuration;
   and wherein the flexible covering does not need to be removed from the frame when the creeper is changed from the operating configuration to the storage configuration;
   further comprising a magnetic closure system having a magnet on at least one of the telescoping members and a second magnet on at least a second of said telescoping members, whereby the magnet and the second magnet affix to one another when the creeper is in the storage configuration.

17. A kit comprising the creeper of claim 1 and a storage bag, said storage bag being of a size capable of storing the creeper when in its storage configuration.

* * * * *

UNITED STATES PATENT AND TRADEMARK OFFICE
CERTIFICATE OF CORRECTION

PATENT NO. : 8,025,299 B2  
APPLICATION NO. : 12/473691  
DATED : September 27, 2011  
INVENTOR(S) : Hiltz Page 1 of 1

It is certified that error appears in the above-identified patent and that said Letters Patent is hereby corrected as shown below:

Column 3, line 24, please delete "a photograph"; and  
Column 3, line 27, please delete "a photograph".

Signed and Sealed this  
Twenty-ninth Day of November, 2011

David J. Kappos  
*Director of the United States Patent and Trademark Office*